United States Patent

Schmeisser

[11] Patent Number: 5,853,839
[45] Date of Patent: Dec. 29, 1998

[54] COMPOSITE DISK

[75] Inventor: Reinhold Schmeisser, Selb, Germany

[73] Assignee: Hoechst Ceramtec Aktiengesellschaft, Selb, Germany

[21] Appl. No.: 617,407

[22] Filed: Mar. 19, 1996

[30] Foreign Application Priority Data

Mar. 21, 1995 [DE] Germany .................. 195 10 204.5

[51] Int. Cl.⁶ ..................................... B32B 3/02
[52] U.S. Cl. .................. 428/64.1; 156/60; 156/73.1; 156/73.5; 251/368; 428/66.1; 428/66.4; 428/66.7; 428/698; 428/699; 428/704
[58] Field of Search ................. 428/64.1, 66.2, 428/66.4, 66.7, 698, 699, 704; 137/625.4; 251/368; 156/73.1, 60, 73.5

[56] References Cited

U.S. PATENT DOCUMENTS

| | | | |
|---|---|---|---|
| 4,258,751 | 3/1981 | Humpert | 137/625.4 |
| 5,372,161 | 12/1994 | Bechte | 137/625.4 |

FOREIGN PATENT DOCUMENTS

| | | |
|---|---|---|
| 0 063 660 | 11/1982 | European Pat. Off. . |
| 0 216 810 | 4/1987 | European Pat. Off. . |
| 0 416 294 | 3/1991 | European Pat. Off. . |
| 0 434 658 | 6/1991 | European Pat. Off. . |
| 3 538 261 | 4/1987 | Germany . |
| 86 06 471 | 10/1988 | Germany . |
| 7 811 932 | 6/1979 | Netherlands . |
| 86/04548 | 8/1986 | WIPO . |
| 86/04658 | 8/1986 | WIPO . |
| 87/02749 | 5/1987 | WIPO . |

*Primary Examiner*—Nasser Ahmad
*Attorney, Agent, or Firm*—Foley & Lardner

[57] ABSTRACT

The invention relates to a composite disk for use as inlet or regulating disk, wherein a support disk and at least one hard material disk having a functional surface are arranged above one another, the support and hard material disks are joined to one another by frictional fastening, forcelocking, formlocking, mechanical interlocking, retention by self substance and/or bonding, the support disk has a thickness of at least 0.6 mm and the hard material disk has a thickness of from 0.05 to 2.5 mm and the hard material disk comprises a material having a Vickers microhardness of at least 1300 HV 0.5. The invention further provides a method of producing a composite disk, which comprises arranging a support disk and at least one hard material disk having a functional surface above one another with the disks having adjacent faces and joining the support disk by frictional fastening, forcelocking, formlocking, mechanical interlocking and/or bonding to the hard material disk by means of adhesive bonding, mechanical intermeshing and/or placing together of rough adjacent faces.

20 Claims, No Drawings

COMPOSITE DISK

BACKGROUND OF THE INVENTION

1. Field of the Invention

The invention relates to a composite disk comprising a support disk and at least one hard material disk having a functional surface for use as inlet or regulating disk.

2. Description of the Related Art

Inlet and regulating disks of a hard material, especially of aluminum oxide ceramic, are used as one-piece disks in large numbers for bathroom taps and equipment for preparing and/or keeping beverages and other liquids. For this purpose, two or three one-piece disks are assembled to form a pairing. In a pairing, it is often the case that disks all comprising an aluminum oxide-rich material run against one another or at least one disk of an aluminum oxide material runs against a disk of another ceramic material such as silicon carbide, silicon nitride or zirconium oxide material. One-piece disks having a higher hardness than aluminum oxide materials cost a number of times as much as disks of aluminum oxide materials. DE-C3-35 38 261 teaches the use of a method of producing a diamond-like, hard carbon layer on valve elements. EP-B-0 216 810 teaches a method of producing a pair of plateshaped elements for a valve, in which physicochemical gas-phase deposition processes were selected for coating the disk-shaped elements. It is known that the coatings applied by gas-phase deposition can only be applied with great technical effort and in a relatively high thickness only using long deposition times. However, the coatings frequently have the deficiency that on sliding and frictional use they detach prematurely from the substrate and, owing to poor intermeshing of grains, they easily tend towards breakaways of material, so that they do not ensure decades of use, unlike materials produced as massive bodies. EP-B-0 416 294 claims a valve element pairing in which at least one disk-shaped valve element bears a plastic coating on the sealing surface. This invention aims at a frictional pairing of ceramic/plastic which runs without grease and provides a seal by means of the plastic layer. The further development of inlet and regulating disks always relates to valves in which the frictional pairing is to run for decades with low coefficients of friction and, if possible, without maintenance. The use of one-piece disks of expensive special materials can frequently not be justified for cost reasons.

SUMMARY OF THE INVENTION

It is therefore an object of the invention to propose a disk which has a low-friction functional surface of hard material and can be mass produced at low cost.

This object is achieved according to the present invention by a composite disk for use as inlet or regulating disk, wherein a support disk and at least one hard material disk having a functional surface are arranged above one another, wherein the support and hard material disks are joined to one another by bonding, frictional fastening, forcelocking, formlocking, mechanical interlocking and/or retention by self substance, wherein the support disk has a thickness of at least 0.6 mm and the hard material disk has a thickness of from 0.05 to 2.5 mm, and wherein the hard material disk comprises a material having a Vickers microhardness of at least 1300 HV 0.5.

This object is further achieved according to the present invention by a method of producing a composite disk, which comprises arranging a support disk and at least one hard material disk having a functional surface above one another with the disks having adjacent faces and joining the support disk by bonding, frictional fastening, forcelocking, formlocking, mechanical interlocking and/or retention by self substance to the hard material disk by means of adhesive bonding, mechanical intermeshing and/or placing together of rough adjacent faces.

DETAILED DESCRIPTION OF THE INVENTION

A sealing disk is an element of a flat slide valve. The term sealing disk is frequently used as a general term for inlet, base, control, regulating and directing disks; owing to the large number of subordinate terms, reference will here be made only to inlet or regulating disks. An inlet disk takes up the incoming liquid streams, while a regulating disk closes, partly opens or completely opens the associated liquid channels in combination with the inlet disk. The single liquid stream or the mixed liquid stream coming from a plurality of liquid channels is finally conducted on through the inlet disk via at least one other channel.

The composite disk can have the same external geometric configuration as one of the known one-piece inlet and regulating disks. The total thickness of the composite disk will then correspond to the thickness of the one-piece disk on which it is based. The composite disk can, like the one-piece disk on which it is based, have openings, pockets, sections having a level lower than the functional surface and a contour deviating from the circular outline.

The composite disk can, owing to a method of production which is different from one-piece disks, have openings and chambers running at an angle, which cannot be produced economically, if at all, in the case of one-piece disks. In the composite disk, channels can be arranged in the region of the interface between support disk and hard material disk, preferably with corresponding recesses in the support disk. In the dry pressing of one-piece ceramic sealing disks, narrow or angled openings can only be produced using costly further machining. Closed chambers into and through which liquid can flow can likewise be introduced in the region of the interface between support disk and hard material disk, preferably with recesses in the support disk.

The support disk serves primarily as a deformation-resistant substrate for the hard material disk. The support disk therefore has a thickness of at least 0.6 mm, preferably at least 0.8 mm, in particular at least 1 mm. It can comprise a material which can be inexpensively mass produced, for example plastic, metal, glass, silicate ceramic or a composite material. Particularly suitable are plastics such as thermoplastic-based materials which can be processed by injection molding, metallic materials such as brass or corrosion-resistant steels and, in particular, plastically processible silicate ceramics such as steatite which can be readily and inexpensively shaped in mass production by dry pressing.

The hard material disk has a functional surface on the side opposite the support disk. Owing to it being designed for decades of use, it has to have high wear resistance and therefore have high hardness. The Vickers microhardness of the hard material disk is preferably at least 1300 HV 0.5, in particular at least 1800 HV 0.5, particularly preferably at least 2400 HV 0.5. The Vickers microhardness is measured in each case in accordance with DIN 50133, February 1985 edition. The composition of the hard material, its microstructure and the nature of the functional surface essentially determine the sliding and frictional behavior. Material variants of the hard material disk having a random distribution of relatively large pores and/or relatively large regions of a soft second phase which wears down more deeply may be of particular interest here. The thickness of the hard material disk can be preferably from 0.2 to 2 mm and particularly preferably from 0.4 to 1.6 mm. Suitable hard material disks are, in particular, ceramic materials and cemented hard materials which are produced as sheet or composite sheet by sheet producing methods, and also other metallic materials which can be processed into sheet metal. The production methods for support and hard material disks from the materials specified are sufficiently well known.

The support disk can be joined to the hard material disk by adhesive bonding. Adhesive bonding technology and the organic and inorganic adhesives are known. The adhesive bonding can be over the full surface or over certain parts of the interface between the support disk and the hard material disk. Mechanical intermeshing serves for joining the support disk to the hard material disk by mechanical interlocking and/or frictional fastening and can be by means of dogs and recesses, by means of tabs, beading and/or screw connections applying a force. To additionally secure an adhesive bond, it may be beneficial to have supporting mechanical intermeshing. In exceptional cases, the disks may be joined by soldering in place of adhesive bonding. The frictional fastening and/or mechanical interlocking of the support disk and the hard material disk can be additionally secured by frictional joining of rough adjoining parts of the interface between support disk and hard material disk.

The advantages of the invention are in the optimum matching of the support and sealing function of the sealing disks, in the more economical manufacture, in a wide range of new geometric variants which have hitherto not been able to be produced economically, if at all, and in the simple integration of a hard material disk into the housing surrounding it.

EXAMPLES

Example 1

A support disk of brass having a thickness of 1.2 mm and an outer diameter 12.7 mm was joined by adhesive bonding to a ceramic disk having an $Al_2O_3$ content of 99% by weight, a thickness of 0.5 mm and an outer diameter of 12.7 mm. The ceramic disk has a Vickers microhardness of 1900 HV 0.5. The shape of the support disk was arrived at by known methods of metal manufacture and working. The shape of the hard material disk was produced by stamping an elastic sheet prior to firing. After adhesive bonding, the edges of the support disk and the hard material disk which faced outwards in the composite disk were rounded. Both the disks were adhesively bonded over the entire surface where they overlapped in the composite disk. An adhesive widely used in industry was employed and placed under pressure for a short time. The functional surface was ground in the composite disk. In a long-term bathroom tap test, the composite disk proved, over 5000 opening and closing cycles, to be just as resistant and have the same long-term suitability from the point of view of the frictional and sliding properties as one-piece hard material disks having the same external geometric configuration.

Example 2

A support disk comprising a plastic based on polypropylene and having a thickness of 4 mm and an outer diameter of 38 mm was produced by injection molding. The hard material disk used was a composite sheet comprising two silicon-infiltrated silicon carbide (SiSiC) sheets sintered together and having a thickness of 1.56 mm and an outer diameter of 38 mm. This material was produced in a very fine-grained variant having SiC grain sizes of not above 15 µm. The SiSiC material had a Vickers microhardness of about 2100 HV 0.5. The individual hard material sheets were cut from the green ceramic sheet by liquid jet cutting, laminated under pressure via a laminating layer and sintered together during infiltration with silicon to form the composite sheet. The hard material disk facing the support disk had, in comparison with the second individual sheet, three additional recesses which engage the three tab-shaped dogs of the support disk so as to give an accurate fit. The individual sheet having the functional surface was provided, unlike the adjacent individual sheet, with two longitudinal recesses as lubricant pockets. The SiSiC composite sheet having a stepped configuration at the edge had polypropylene injection molded around the sides.

Example 3

A composite disk comprising a support disk of corrosion resistant chromium-nickel steel and a hard material disk of sintered silicon carbide (SSiC) was made as in Example 1. The SSiC material had a Vickers microhardness of about 2800 HV 0.5. In addition, the sides of the hard material disk were chamfered so that the functional surface was smaller than the reverse side of the hard material disk. After adhesive bonding, the composite disk was additionally surrounded with a plastic based on polypropylene in an injection molding machine, with the plastic not projecting vertically above the functional surface of the composite disk. The hard material disk was here enclosed in a dovetail manner.

Example 4

A composite disk comprising a support disk of plastic based on polypropylene was joined as in Example 2 to a hard material disk which, however, comprised a nickel-containing cemented hard material sheet particularly resistant to corrosion by water. The adjacent surfaces of the support disk and the hard material disk were roughened by grinding so that they were also frictionally joined to one another by accurate placing together of the rough surfaces. The composite disk produced by frictional joining of the parts and additionally anchored by means of close-fitting dogs and recesses has three openings for the cold and hot water streams of the mixer taps. Two of the three openings passed through the support disk at an angle of 45° Such angled openings in ceramic bodies cannot be produced by a simple dry pressing technique.

I claim:

1. A composite disk useful as an inlet or regulating disk comprising:

a support disk that has a thickness of at least 0.6 mm, and
   at least one hard material disk having a functional surface opposite the support disk, the hard material disk being joined by one or more of bonding, frictional fastening, forcelocking, formlocking, mechanical interlocking, and retention by self substance to the support disk, wherein the hard material disk has a thickness of from 0.05 to 2.5 mm and comprises a material having a Vickers microhardness of at least 1300 HV 0.5.

2. A composite disk as claimed in claim 1, wherein the support disk and hard material disk are joined to one another by adhesive bonding.

3. A composite disk as claimed in claim 1, wherein the support disk has a thickness of at least 0.8 mm.

4. A composite disk as claimed in claim 1, wherein the support disk has a thickness of at least 1 mm.

5. A composite disk as claimed in claim 1, wherein the support disk comprises plastic, metal, glass, silicate ceramic, or a composite material.

6. A composite disk as claimed in claim 1, wherein the hard material disk has a Vickers microhardness of at least 1800 HV 0.5.

7. A composite disk as claimed in claim 1, wherein the hard material disk has a Vickers microhardness of at least 2400 HV 0.5.

8. A composite disk as claimed in claim 1, wherein the hard material disk comprises silicon carbide, silicon nitride, zirconium oxide, aluminum oxide, or cemented hard material.

9. A composite disk as claimed in claim 1, wherein the hard material disk has a thickness of from 0.2 to 2 mm.

10. A composite disk as claimed in claim 1, wherein the hard material disk has a thickness of from 0.4 to 1.6 mm.

11. A composite disk as claimed in claim 1, wherein the hard material disk is smaller than the support disk and wherein the support disk is configured in such a way that it at least partly surrounds the hard material disk at the sides, with the support disk surrounding the hard material disk not projecting vertically above the plane of the functional surface of the hard material disk, at least in the region of a sealing disk running against it.

12. A composite disk as claimed in claim 1, wherein adjacent faces of the support and hard material disks have a boundary surface in the region of which are arranged one or more of channels, angled openings, and chambers.

13. A method of producing a composite disk as claimed in claim 1, comprising arranging the support disk and the at least one hard material disk having a functional surface on one another with the disks having adjacent faces; and joining the support disk by one or more of bonding, frictional fastening, forcelocking, formlocking, mechanical interlocking, and retention by self substance to the hard material disk.

14. A method of producing a composite disk as claimed in claim 13, wherein the hard material disk is produced by a ceramic sheet-producing method, as cemented hard material sheet, or as sheet metal.

15. A method of producing a composite disk as claimed in claim 13, wherein the support disk comprises plastic and the support disk is joined to the hard material disk by welding of the plastic.

16. A composite disk as claimed in claim 1, which has one or more of openings, pockets, sections having a level lower than the functional surface, and contours.

17. An inlet disk comprising a composite disk as claimed in claim 1.

18. A regulating disk comprising a composite disk as claimed in claim 14.

19. A composite disk as claimed in claim 1, wherein the support disk includes recesses on the surface adjacent to the hard material disk.

20. A composite disk as claimed in claim 1, wherein the support disk comprises a plastic material, metal, or silicate ceramic, and the hard material disk comprises ceramic material.

* * * * *